Oct. 13, 1942.  H. F. WATERS  2,298,522
METHOD OF MANUFACTURING BAGS
Original Filed Jan. 26, 1938
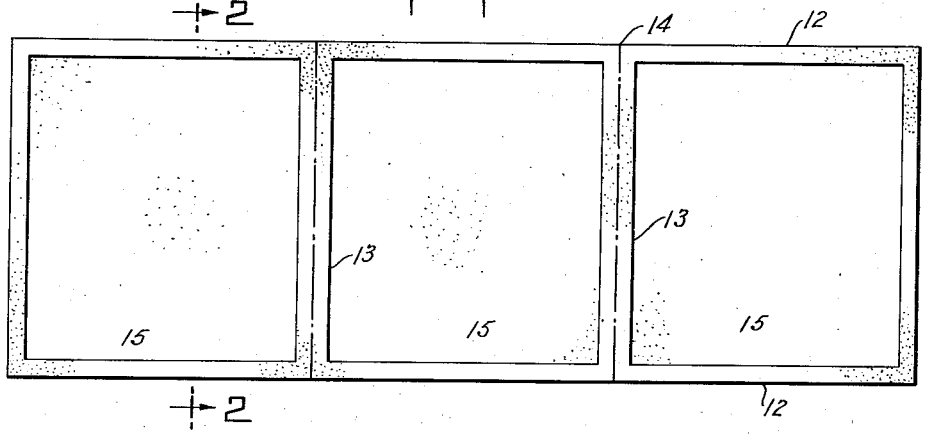
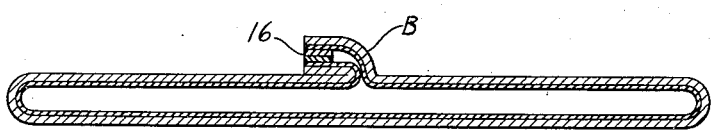
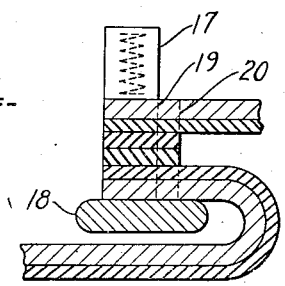
INVENTOR
*HARRY F. WATERS*
BY
*James D. Bock*
ATTORNEY Patented Oct. 13, 1942

2,298,522

UNITED STATES PATENT OFFICE 2,298,522

METHOD OF MANUFACTURING BAGS

Harry F. Waters, New York, N. Y.

Original application January 26, 1938, Serial No. 186,957. Divided and this application October 3, 1940, Serial No. 359,487

3 Claims. (Cl. 93—35)

My present invention relates to improvements in the manufacture of bags or similar containers, and, more particularly to improvements in the manufacture of fluid and liquid-tight containers wherein the seam-forming steps are so carried out as to prevent injury to the material from which the bags are made.

This application is a division of my copending application Serial No. 186,957, filed January 26, 1938.

In the manufacture of fluid and liquid-tight bags the material used may be inherently impervious to fluids and liquids, or the material, such as paper, regenerated sheet cellulose, cellulosic esters and analogous materials may be coated with a suitable liquid and fluid-proof material. An example of this latter type of sheeted material and suitable for many purposes is known and sold under the name of "M. S. T. Cellophane." Many liquid-proof coatings are available such as rubber hydrochloride, synthetic resins, polymerized resins, proteins and the like. In the manufacture of bags of the type above described, it is usually more desirable to use a coating which, in addition to being impervious to and unaffected by liquids and fluids, is thermoplastic. Such a characteristic permits the formation of a highly satisfactory liquid and fluid-tight closure by the use of heat sealing mechanisms.

I have found, however, that when a coated sheet material is used the seams formed during the bagmaking process are not uniformly satisfactory when heat sealing devices are used because the coating, being in the order of .001" or .002" thick, is readily broken, forming small pinhole openings or fine, hair-like cracks through which the liquid or fluid packed in the bag will seep. Accordingly, one object of my invention is to print or otherwise apply to the coated surface of the sheet material predetermined bands of any thermoplastic liquid and/or fluid-proof adhesive, such as rubber hydrochloride, polymerized resins, proteins and the like, so positioned that as the bags are formed they will complement each other to provide sufficient adhesive to form satisfactory seams. Preferably, the adhesive used is made of the same material as the coating. In any event, as will be hereinafter pointed out, the temperature at which the adhesive becomes thermoplastic must not be higher than the temperature at which the coating becomes plastic. In some cases I have found it desirable similarly to treat sheet material which is itself thermoplastic, as, for example, a rubber hydrochloride sold under the trade-name "Pliofilm," or any other suitable thermoplastic sheet material.

When heat and pressure are used to obtain the proper adhesion of the superimposed bands of adhesive above described, the heat has a tendency to injure the coating which lies adjacent to the inner marginal edges of the bands of adhesive; in some cases to the extent of exposing portions of the base sheet. Unless the base sheet is also liquid and fluid-proof failure of the coating will result inevitably in the formation of an unsatisfactory liquid and fluid-tight bag. Accordingly, it is another object of my invention to provide an improved method of applying heat and pressure to the seams whereby the destruction of the coating is avoided. Broadly stated, the method which I employ consists in applying the heat to the bands of adhesive with the exception of the inner marginal edges thereof. These marginal edges insulate the coating from the heated adhesive and tend to absorb that heat. The temperature employed in forming a satisfactory bond between the bands of adhesive will have dropped sufficiently to prevent injury to the material used to coat the sheet or web resulting from a dissipation of the heat by the inner section or margin of the bands of adhesive.

These and other objects of my present invention will become apparent from a reading of the following detailed description and by reference to the attached drawing in which Fig. 1 is a plan view of a web of coated sheet material provided with bands of adhesive arranged in predetermined relation;

Fig. 2 is an enlarged sectional view taken along the lines 2—2 of Fig. 1;

Fig. 3 is a sectional view through a container or bag made from one of the blanks shown in Fig. 1; and Fig. 4 is an enlarged sectional view of the seam shown in Fig. 1 and illustrating the method by which the desired bond between the meeting bands of adhesive is formed.

Referring now to the drawing in which like numerals indicate like parts and in particular to Figs. 1 and 2, I have shown a web of sheet material 10 provided with a liquid and fluid-proof coating 11. The web is preprinted or otherwise provided with marginal bands of adhesive 12 preferably thermoplastic in nature and spaced transversely disposed lines of similar adhesive 13 preferably being about twice as wide as the bands 12 so that when the web is severed along the dotted lines 14 each of the blanks 15 will be provided with a band of adhesive extending continuously along the marginal edges thereof. If the liquid-proof coating chosen is the same as the adhesive chosen the coating and adhesive may be applied to the web simultaneously by a preprinting method employing a suitably cut intaglio roll, utilizing any of the conventional types of usual printing mechanisms. As has been previously pointed out the base sheet may be made of paper such as kraft paper, sulphite bond or parchment paper, sheeted, transparent or translucent cellulosic material as, for example, regenerated sheet cellulose known under the name "Cellophane." If desired, sheet material inherently liquid and fluid-proof can be used, such as rubber, the halogen derivatives of rubber, the most well known being rubber hydrochloride, sheeted polymerized resins, protein films, etc. For the coating, many types may be employed, such as any of the types just described. For commercial operations, I prefer to use a material which is thermoplastic in addition to being liquid and fluid-proof, such as rubber hydrochloride. The adhesive used is also preferably rubber hydrochloride or rubber derived from latex.

Further in the commercial practice of my invention the adhesive and coating possess the same general characteristics, particularly as to the temperature at which they become thermoplastic, and are usually the same material. However, should the coating and adhesive be different materials, the temperature at which the coating becomes plastic should be higher than the temperature at which the adhesive becomes plastic. Otherwise the coating might break down before the adhesive, thereby ruining the seam being formed.

The web 10 may first be formed into a tube in accordance with well known bag making processes or it may be first severed into bag blanks and each blank folded into tubular form. In Fig. 3 I have shown an enlarged detailed sectional view taken through the body portion of a bag formed from the web illustrated in Fig. 1. The seam, designated generally by the letter B, is of the same type as that disclosed and claimed in my copending application Serial No. 91,363, filed July 18, 1936, with certain changes in construction hereinafter described. The body portion is so formed as to bring the marginal bands of adhesive 12 into contacting relation, this being accomplished by giving one marginal edge of the blank a reverse fold 16. It will be appreciated that the seam can be formed by first bringing each marginal edge of the blank into contacting relation, causing a flow of the adhesive to form the desired bond and thereafter, in some instances, folding the seam against the wall of the bag to which it may thereafter be secured if desired.

The particular method of folding the material to form the body portion of the container will depend on whether it is desired to position the seam in either front or back wall of the container or in the end walls. If it is desired to form a gusseted back, the seam shown in Fig. 2 is to be preferred.

In accordance with my present invention the seam is formed by applying thereto heat and pressure or heat alone in such a manner that the inner edge of each band of adhesive will act to protect the coating from any possible deleterious effect of the heat to which the remainder of the band of adhesive is subjected. Referring now to Fig. 4 it will be noted that the heating element 17 of the heat sealing unit is narrower than the bands of adhesive 12. A resilient or conformable backing member 18 of the heat sealing units may be constructed in accordance with the invention disclosed and claimed in my Patent No. 2,125,758 granted August 2, 1938, and may be of any suitable width. In commercial practice the backing member 18 is preferably wider than the bands of adhesive so as to provide a comparatively substantial backing for the seam.

When pressure is exerted on the seam, usually by pressing the heatable element 17 thereagainst, the heat will be transmitted through the base sheet, through the coating and through the bands of adhesive. Since the heat will flow directly downward through these layers, they will receive more of the heat than those layers not directly underneath the heatable element so that there is provided an excess of thermoplastic material adjacent the inner edge of the seam. This excess of material will prevent any possible destruction of the thin coating 11 at the area contained within the dotted lines 19 and 20 since if heat applied should be sufficiently great to cause a flow of the coating, the excess of thermoplastic material in the bands of adhesive will also flow sufficiently to fill any breaks or cracks.

It will be appreciated that the above method is equally efficacious when thin sheets of thermoplastic material previously mentioned are used in forming the container since, due to their thinness, the temperatures employed to form the desired seam may form small holes in the sheet material, particularly at the point where the edge of the heatable element strikes the material. By providing thermoplastic bands of adhesive wider than the working face of the heatable element, sufficient material is present to fill any such holes.

It is to be further appreciated that the principles of my present invention may be employed in forming the bottom of the bag or container since when the body portion has been formed each transverse band will be overlapped upon itself. After the bag has been filled the same method may be employed to form the closure.

These and other applications of the principles of my present invention will be obvious to those skilled in the manufacture of containers of all descriptions. The invention, therefore, is not to be limited except by the scope of the appended claims which are to be broadly construed.

I claim:

1. In a method of forming a seam incident to the making of a bag from flexible sheet material having at least the surface destined to become the inner surface of the bag provided with a coating of material affected by heat, the steps of providing marginal areas of said surface with bands of thermoplastic adhesive, bringing the areas thus provided with adhesive into opposed face to face relationship, and applying heat to said adhesive along a longitudinal strip narrower than the width of said bands and remote from the inner edges of said bands to cause a fusion of said adhesive within said strip while avoiding application of deleterious heat to the surface of said bag adjacent the inner edges of said adhesive bands.

2. In a method of forming a seam incident to the making of a bag from flexible sheet material having at least the surface destined to become the inner surface of the bag provided with a coating of material affected by heat, the steps of providing marginal areas of said surface with bands of thermoplastic adhesive, bringing the areas thus provided with adhesive into opposed face to face relationship, and applying heat to said adhesive along a longitudinal strip narrower than the width of said bands and remote from the inner edges of said bands to cause a fusion of said adhesive to seal said seam along said strip and to form a dam extending toward the inner edges of said bands to prevent escape of said heated adhesive from said seam.

3. In a method of forming a seam incident to the making of a bag from flexible sheet material having at least the surface destined to become the inner surface of the bag provided with a coating of material affected by heat, the steps of providing marginal areas of said surface with bands of thermoplastic adhesive, folding said material to bring opposed marginal areas of said surface thus provided with adhesive into juxtaposed relation, folding one of said marginal areas back upon itself to bring marginal areas thus provided with adhesive into face to face relationship, and applying heat to said adhesive along a longitudinal strip narrower than the width of said bands and remote from the inner edges of said bands to cause a fusion of said adhesive within said strip while avoiding application of deleterious heat to the surface of said bag adjacent the inner edges of said adhesive bands.

HARRY F. WATERS.